Dec. 6, 1955

L. A. LEIFER 2,725,775

HIGH-SPEED MOTOR-DRIVEN LATHE AND
TEMPERATURE CONTROL MEANS

Filed Dec. 20, 1951

INVENTOR.
Lorenz A. Leifer
BY Andrus & Scales
Attorneys

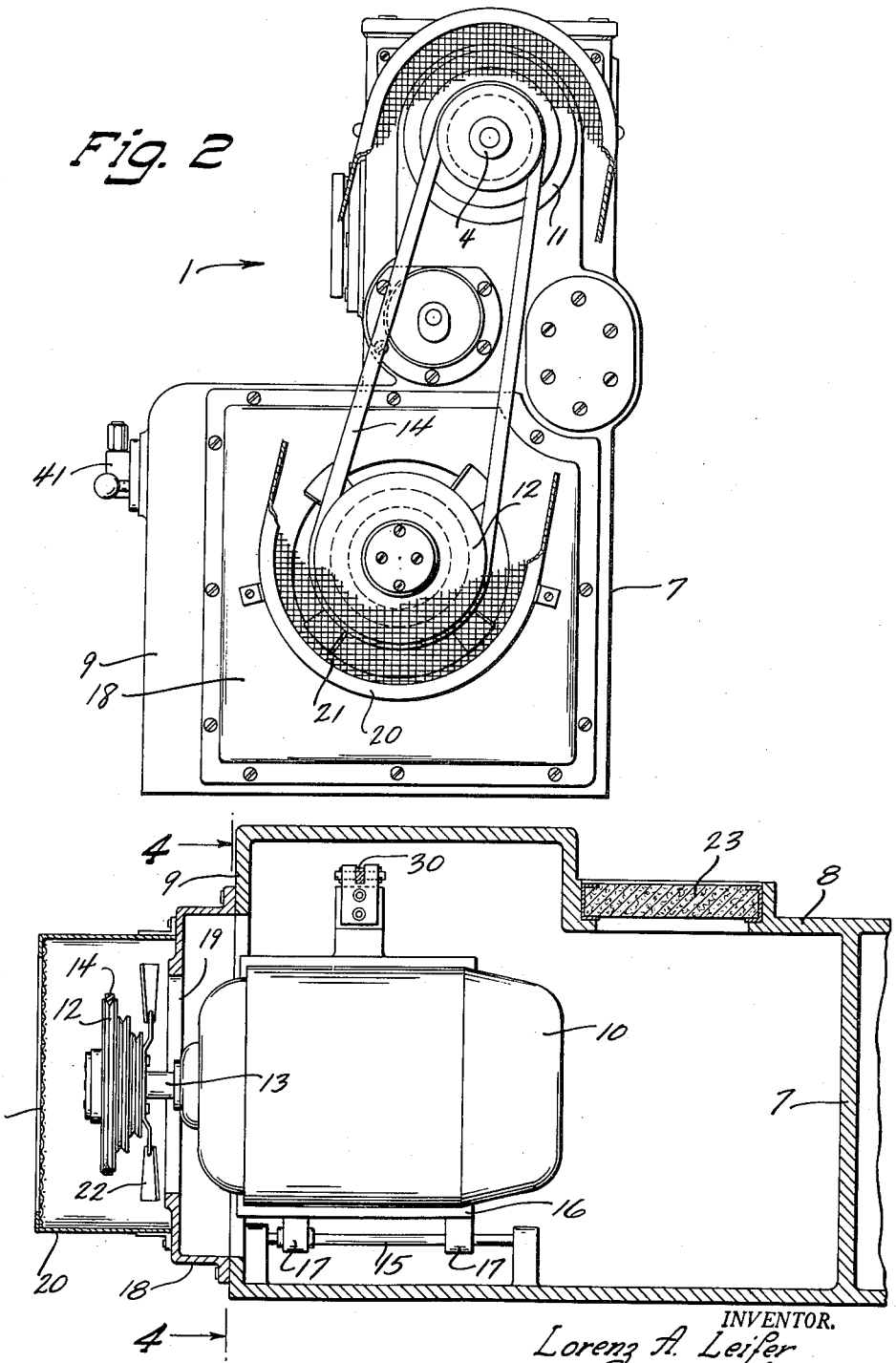

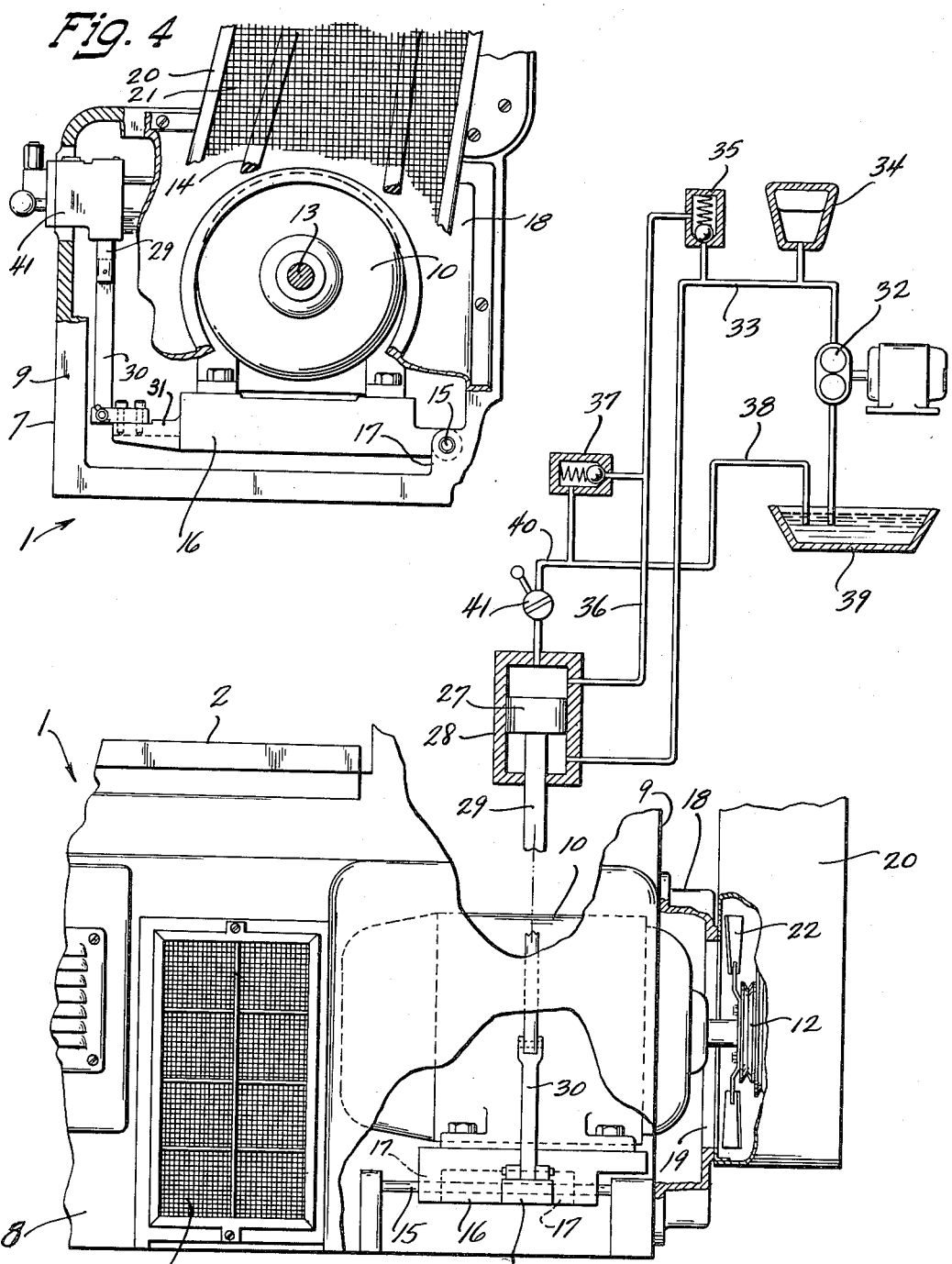

United States Patent Office 2,725,775
Patented Dec. 6, 1955

2,725,775

HIGH-SPEED MOTOR-DRIVEN LATHE AND TEMPERATURE CONTROL MEANS

Lorenz Albert Leifer, Madison, Wis., assignor to Gisholt Machine Company, Madison, Wis., a corporation of Wisconsin Application December 20, 1951, Serial No. 262,616

2 Claims. (Cl. 82—2)

This invention relates to high-speed motor-driven machines such as turret lathes and particularly to provisions for maintaining the motor and lathe within reasonable operating temperatures by air circulating means mounted on the motor shaft while providing for the selective adjustment of the motor to allow the proper tensioning of the belt and for removal of the belt.

An object of the invention is to provide adequate controlling of the motor and protection of the motor against dust and other contaminants present in the atmosphere surrounding the device as well as chips coming from the operation of the lathe. By this means it becomes possible to use the relatively inexpensive, and higher duty-rated open type motor.

Another object is to provide air circulating means operated directly by the motor driving the machine which is adapted to maintain the same and motor within reasonable operating temperatures and which includes a readily accessible filter of adequate size for easy replacement in the base of the machine preferably at the rear thereof.

Another object is to provide air-cooling of the motor and base of the lathe while allowing relative adjustment of the motor for tightening or replacement of the belt and while protecting the motor against damage by dust chips and other contaminants.

These and other objects will be more fully set forth in the following description of an embodiment of the invention illustrated in the accompanying drawings.

In the drawings:

Fig. 2 is an end elevation of the lathe with parts broken away and sectioned to show the belt and the position of the fan relative to the base;

Fig. 3 is a horizontal sectional view through the base of the lathe showing the motor mounting and cylinder for the hydraulic adjustment of the motor;

Fig. 4 is an end elevation of the motor and mounting therefor with the base of the lathe broken away and sectioned; and Fig. 5 is a rear elevation of the base of the lathe showing the hydraulic means of adjustment of the motor and with the hydraulic system therefor shown diagrammatically.

Figure 1:
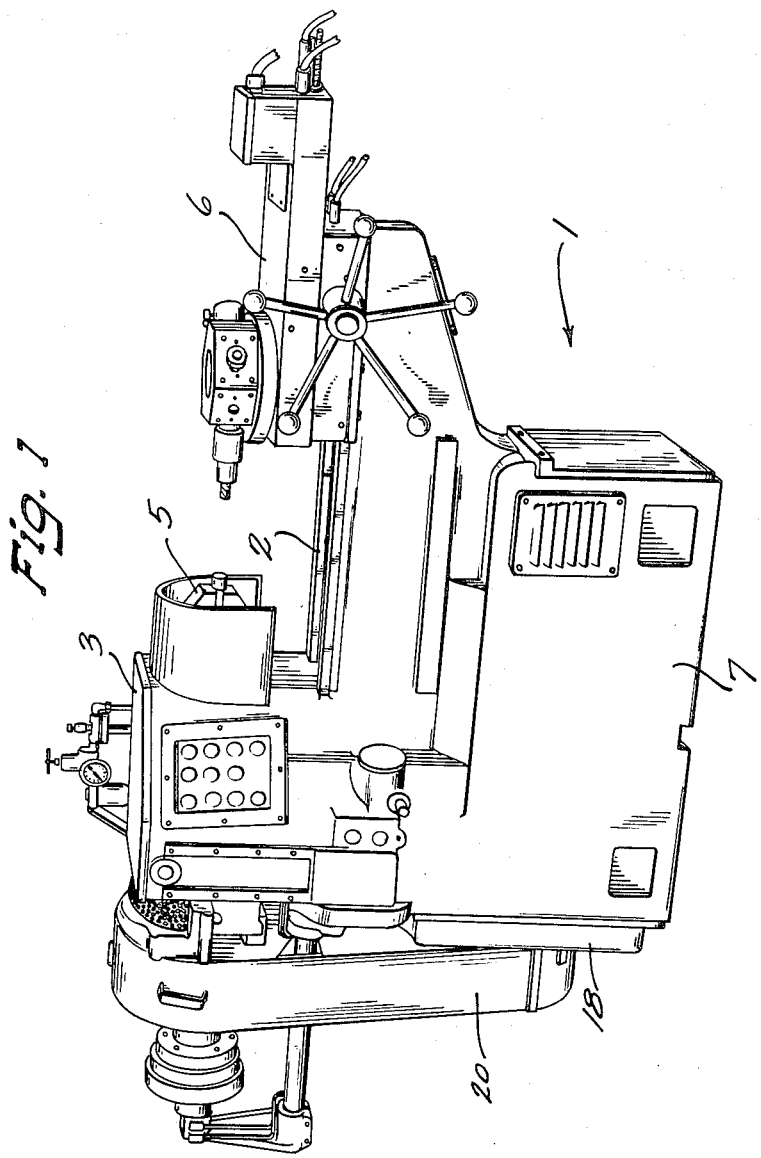
Figure 1 is a front perspective view of the lathe.

The turret lathe 1 shown in the drawings is a high-speed, production lathe adapted to perform a given series of operations in rapid sequence. The lathe 1 includes the bed 2 and the headstock 3 which supports the horizontal spindle 4. The chuck 5 for receiving the work is carried by spindle 4 at one end thereof and over bed 2 adjacent to the turret slide 6, which latter is adapted to carry a number of tools, not shown, for cutting the work in a given sequence.

The hollow base 7 of the lathe supports bed 2 and headstock 3. For added rigidity, the bed 2, headstock 3 and base 7 are preferably incorporated in a single casting which includes a rear panel 8 and an open end 9 for installation of the motor 10 beneath headstock 3. The stepped pulley or sheave 11 is mounted on spindle 4 at the end of the lathe and above the corresponding stepped drive pulley or sheave 12 mounted on shaft 13 of motor 10 therebeneath. The belt 14, mounted on sheaves 11 and 12, provides the driving connection between the motor and the lathe for rotation of spindle 4 and chuck 5, and is adapted to be selectively mounted in the corresponding grooves of each sheave to provide the desired speed of operation of the lathe.

The rod 15 which is fixed within base 7 of the lathe extends horizontally and parallel to the axis of spindle 4 within the headstock 3. The base 16 of the motor is provided with brackets 17 on one side thereof and by which the motor is pivotally mounted and supported on rod 15. The end cover plate 18 is provided with a generally circular opening 19 and otherwise closes the open end 9 of base 7. Motor 10 is mounted within base 7 as described so that the shaft 13 of the motor projects through opening 19 and carries the sheave 12 outside thereof and in parallel alignment with the sheave 11 on spindle 4. The belt guard 20 fully encloses sheaves 11 and 12 and covers opening 19. A portion 21 of guard 20 is perforated or screened to provide for air circulation therethrough, as will be described.

According to the invention, the fan 22 mounted on shaft 13 of motor 10 for rotation therewith, effects the circulation of air through base 7 and over motor 10 and maintains the lathe and particularly motor 10 within normal operating temperatures. The filter 23 mounted in a suitable opening formed in the rear panel 8 of base 7 is of substantial size to allow an adequate volume of cooling air to pass with nominal resistance into the base, and is provided to prevent chips coming from the work in the operation of the lathe, or cutting oil or other foreign material from being carried with the circulated air and reaching motor 10. The use of filter 23 allows the employment of a motor of open-frame construction and the circulation of air directly over the windings of the motor.

In the operation of the lathe, the air is drawn by fan 22 through filter 23 into the base 7 of the lathe to pass over motor 10 to cool the latter before leaving base 7 through opening 19 and into guard 20. From guard 20, the air is released through the screened portion 21 of the guard.

The adjustment of motor 10 on rod 15 is provided to increase or decrease the between-centers distance between shaft 13 and spindle 4 whereby belt 14 may be removed for replacement, or readjusted on sheaves 11 and 12, or the tension of the belt adjusted. Such adjustment is effected hydraulically by the piston 27 operating vertically within the cylinder 28 mounted on the inside of base 7 adjacent to motor 10 and on the side thereof oppositely of brackets 16. The rod 29 extending downwardly from piston 27 is connected by the link 30 to the arm 31 of motor base 16 whereby movement of piston 27 vertically within cylinder 28 moves motor 10 on the axis of rod 15.

The hydraulic system, diagrammatically shown in Fig. 5, is similar to that described in the copending application of the present inventor entitled Hydraulic Motor Adjustment for Machine Tools, filed December 20, 1951, Serial No. 262,615, and includes the constant delivery pump 32 which is operated by a suitable motor independently of the motor 10. The pressure line 33 provided with the accumulator 34 is connected to the lower end of cylinder 28 to provide a constant delivery of fluid thereto which is maintained by pump 32 at all times throughout the operation of the lathe and by accumulator 34 for limited periods thereafter. The relief valve 35 is connected to line 33 to establish an allowed maximum pressure within line 33 at all times. The discharge line 36 from valve 35 is connected to the second relief valve 37 and to the upper end of cylinder 28. The discharge line 38 from relief valve 37 returns to the oil reservoir 39 supplying pump 32. Relief valve 37 is adapted to establish a maximum pressure in line 36 which is substantially less than that maintained by valve 35 in line 33.

Line 33 is connected to the lower end of cylinder 28, and supplies a fluid under pressure to raise piston 27 and lift base 16 of motor 10. Line 36 is connected to the upper end of cylinder 28 and operates against the pressure within line 33 according to the relative effective diameters of the upper and lower parts of the piston. The effective pressure differential serves to support a portion of the weight of the motor as determined by the relative offsets of shaft 13 of the motor and the end of arm 31 of base 16. The balance or unsupported weight of motor 10 is utilized to effect and maintain a corresponding tensioning of belt 14.

The discharge line 40 connects the upper end of cylinder 28 and the discharge line 38 of valve 37, and is controlled by the hand-operated valve 41, shown diagrammatically in Fig. 5 and in Fig. 2 as mounted on the rear of the base 7 of the lathe.

Valve 41 is normally maintained closed, whereby the pressure effected in lines 33 and 36 by the corresponding valves 35 and 37, provides the desired tension of belt 14 as described. By opening valve 41, the pressure within line 36 and the upper end of cylinder 28 is released, whereby the pressure maintained in line 33 becomes entirely effective in cylinder 28 beneath piston 27 to lift motor 10 on base 16 for replacement of belt 14 or changing the adjustment of belt 14 on step pulleys 11 and 12.

The floating adjustment of motor 10 on rod 15 as provided for, accommodates belts of various lengths and allows the belt to be tensioned as its length changes in service. Irrespective of the position of motor 10 by which the adjustment of belt 14 is made, fan 22 is at all times effective to maintain the force of air through filter 23 and through base 7 and over motor 10. Fan 22 may be of various types and operate axially or centrifugally or both. As driven by motor 10 directly on shaft 13, the fan is most readily adapted to effect the adequate circulation of air against the resistance of filter 23, necessary for cooling the motor and lathe. Filter 23 is located at the rear of the lathe and is readily accessible for replacement and inspection or cleaning. Removal of the filter provides an access to the interior of base 7.

The invention is particularly adapted for high-speed lathes and allows the motor to be mounted within the base of the lathe, thereby reducing the floor area required therefor. By providing a filter of adequate size and fine mesh, motors of less expensive construction having open frames with exposed windings may be employed. Such motors will operate continuously at lower temperatures and higher ratings with the more adequate direct cooling of the windings provided for.

Various embodiments of the invention may be employed within the scope of the following claims.

I claim:

1. In a machine tool including a bed and a headstock, a shaft carried by said headstock and having an overhanging end extending therefrom, a driven pulley carried by the overhanging end of said shaft, a hollow cast metal base supporting said bed and headstock, said base having an opening at one end thereof beneath said headstock and a second opening oppositely disposed with respect thereto, an air-cooled motor disposed within said base and having a pulley shaft projecting horizontally through said first named opening, a drive pulley mounted on said motor shaft exteriorly of said base, a belt mounted on said pulleys operatively connecting the motor and said first named shaft to drive the latter, a pivotal mounting disposed in parallel relationship to said motor shaft and supporting one side of said motor within said base, means connecting the side of the motor opposite said pivotal mounting to the movable member of a hydraulic cylinder and piston structure disposed vertically to lift the motor on said side, means for providing fluid under pressure to both sides of said piston within said cylinder, means for controlling the relative fluid pressures on each side of said piston so as to adjustably pivot the motor on said mounting, and a fan mounted on said motor shaft adjacent to said first named opening whereby the operation of the motor and tool effects circulation of air through said opening and said base over the motor to cool the latter and maintain the bed at normal operating temperatures, said fan being disposed to allow the pivotal adjustment of said motor without affecting the operation of the fan.

2. The construction of claim 1, in which a filter unit is removably secured over said second-named opening to prevent chips and dust from reaching the motor, said motor is an open air-cooled electric motor which would normally be damaged by chips and the like, and said fan is disposed outside said first-named opening to draw air through said filter into the base and out through said first-named opening.

References Cited in the file of this patent

UNITED STATES PATENTS

| | | |
|---|---|---|
| 683,968 | Moskowitz | Oct. 8, 1901 |
| 1,909,564 | Armitage | May 16, 1933 |
| 2,042,510 | Cornelius | June 2, 1936 |
| 2,215,257 | Svenson | Sept. 17, 1940 |
| 2,257,849 | Martellotti | Oct. 7, 1941 |
| 2,545,053 | Siekmann | Mar. 13, 1951 |
| 2,581,928 | Broden | Jan. 8, 1952 |
| 2,660,837 | Hill | Dec. 1, 1953 |

FOREIGN PATENTS

| | | |
|---|---|---|
| 197,965 | Great Britain | Aug. 21, 1924 |